United States Patent
Putnik et al.

(10) Patent No.: US 11,060,867 B2
(45) Date of Patent: Jul. 13, 2021

(54) ROTATION RATE SENSOR AND METHOD FOR MANUFACTURING A ROTATION RATE SENSOR

(71) Applicant: Robert Bosch GmbH, Stuttgart (DE)

(72) Inventors: Martin Putnik, Reutlingen (DE); Stefano Cardanobile, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 253 days.

(21) Appl. No.: 16/056,905

(22) Filed: Aug. 7, 2018

(65) Prior Publication Data

US 2019/0041213 A1 Feb. 7, 2019

(30) Foreign Application Priority Data

Aug. 7, 2017 (DE) .................. 102017213644.8

(51) Int. Cl.
*G01C 19/5755* (2012.01)
*G01C 19/5642* (2012.01)
*G01P 15/08* (2006.01)

(52) U.S. Cl.
CPC .... *G01C 19/5755* (2013.01); *F16F 2238/022* (2013.01); *G01C 19/5642* (2013.01); *G01P 2015/0805* (2013.01)

(58) Field of Classification Search
CPC ............ G01C 19/5712; G01C 19/5719; G01C 19/5733; G01C 19/5747; G01C 19/5621; G01C 19/5656; G01C 19/574; G01C 19/5755; G01C 19/5762; B81B 2201/0235; B81B 2203/0163; B81B 3/0072; B81B 2201/0242; B81B 2203/0109; B81B 2201/016; B81B 2201/0228; B81B 2201/025; B81B 2203/0136; B81B 2203/0307; B81B 3/0051; G01P 15/125; G01P 15/0802; G01P 1/003; G01P 3/44; G01P 15/032; G01P 15/097; G01P 15/14; G01P 1/023; G01P 2015/082; F16F 1/18;
(Continued)

(56) References Cited

U.S. PATENT DOCUMENTS

| 5,531,115 A * | 7/1996 | Erdley ................... G01C 19/56 |
| | | 702/104 |
| 5,945,599 A * | 8/1999 | Fujiyoshi ........... G01C 19/5719 |
| | | 73/504.12 |

(Continued)

FOREIGN PATENT DOCUMENTS

DE 102014225021 A1 6/2016

*Primary Examiner* — Nimeshkumar D Patel
*Assistant Examiner* — Gedeon M Kindanu
(74) *Attorney, Agent, or Firm* — Norton Rose Fulbright US LLP; Gerard Messina

(57) ABSTRACT

A rotation rate sensor includes a substrate and a drive structure that is movable relative to the substrate and is fastened to the substrate via a spring system that includes first and second spring components that each connects the drive structure and the substrate and that are joined by an intermediate piece, the drive structure being joined to the intermediate piece via the first portion, and the intermediate piece or a center area, which is at least partially situated between the first and second portions, being joined to the substrate via the second portion, the first and/or second portions having a respective varying base area in a respective main extension direction of the first and second portions, respectively.

15 Claims, 2 Drawing Sheets

(58) Field of Classification Search
CPC .................. F16F 1/26; F16F 2228/066; F16F 2230/0047; F16F 2238/022
See application file for complete search history.

(56) References Cited

U.S. PATENT DOCUMENTS

| | | | | |
|---|---|---|---|---|
| 6,349,597 | B1* | 2/2002 | Folkmer | G01C 19/5712 73/504.02 |
| 6,571,629 | B1* | 6/2003 | Kipp | B81B 3/0072 73/504.14 |
| 6,742,390 | B2* | 6/2004 | Mochida | G01C 19/5719 73/504.04 |
| 6,953,753 | B2* | 10/2005 | Oohara | B81C 1/0019 216/67 |
| 7,093,487 | B2* | 8/2006 | Mochida | G01C 19/5719 73/504.14 |
| 8,616,057 | B1* | 12/2013 | Mao | G01C 19/574 73/504.14 |
| 9,038,456 | B2* | 5/2015 | DiStasio | G01V 7/16 73/382 G |
| 2006/0032306 | A1* | 2/2006 | Robert | G01C 19/574 73/504.02 |
| 2010/0024547 | A1* | 2/2010 | Katsuki | G01C 19/5719 73/504.12 |
| 2011/0138912 | A1 | 6/2011 | Degawa et al. | |
| 2012/0279301 | A1* | 11/2012 | Gunthner | G01C 19/574 73/504.12 |
| 2014/0144232 | A1* | 5/2014 | Lin | B81B 3/0051 73/504.12 |
| 2015/0168437 | A1* | 6/2015 | Jomori | G01C 19/5747 73/496 |
| 2016/0138667 | A1* | 5/2016 | Pruetz | F16F 1/18 267/158 |
| 2019/0002274 | A1* | 1/2019 | Cardanobile | B81C 1/00658 |

* cited by examiner

ROTATION RATE SENSOR AND METHOD FOR MANUFACTURING A ROTATION RATE SENSOR

CROSS-REFERENCE TO RELATED APPLICATIONS

The present application claims priority under 35 U.S.C. § 119 to DE 10 2017 213 644.8, filed in the Federal Republic of Germany on Aug. 7, 2017, the content of which is hereby incorporated by reference herein in its entirety.

FIELD OF THE INVENTION

The present invention relates to a rotation rate sensor.

BACKGROUND

Rotation rate sensors on substrates are generally known. Such rotation rate sensors are special microelectromechanical systems (MEMS) with the aid of which rotation rates can be measured. Such sensors are used in a wide variety of applications. Typically, rotation rate sensors include one or multiple drive structures. These drive structures are moved with the aid of spring systems and are resiliently joined to the substrate by the spring systems. Spring systems/spring structures designed having folded beams tend to have lower tensile stress than simple beams, at the same stiffness. Such springs are referred to as U-springs. A special design of spring systems are two joined U-springs, which are joined by a wide spring head (flying bar). Such spring systems are also referred to as double-folded beam suspension (DFBS).

Spring systems known from the related art, also known as DFBS, however, partially have a large deviation from a desired linear restoring force during operation, which has an interfering effect on the behavior of the rotation rate sensors.

SUMMARY

According to an example embodiment of the present invention, a rotation rate sensor includes a drive structure fastened to a substrate via a spring system, which has an improved sensor behavior compared to rotation rate sensors known from the related art.

Compared to rotation rate sensors known from the related art, the rotation rate sensor according to an example embodiment of the present invention has the advantage that the mechanical nonlinearity of the drive oscillation of the spring system (for example of the DFBS) is reducible or is reduced through the use of a profiled first portion and/or second portion of a spring component (for example a U-spring). It is possible that the base area of the first and/or second portion(s), i.e., the cross-sectional surface of the respective portion perpendicular to the main extension direction of the respective portion, changes over the length of the respective portion. For example, the width and/or the height of the first and/or second portion(s) change(s) over the length of the respective portion, whereby the first and/or second portion(s) has/have a profiled design. With the aid of such a first and/or second portion(s), it is possible to cost-effectively improve the behavior of the spring system, and thus of the rotation rate sensor. According to the present invention, it is advantageously possible to maintain the frequency of the drive oscillation by adapting/varying the local base area of the first and/or second portion(s) (over the length of the respective portion), without having to adapt the sensor core. A reduction of the nonlinearity of the drive oscillation has the further advantage that the excitability of parasitic modes occurring locally on the spring structure/spring system and the feedback from the drive oscillation on these parasitic modes are reduced. According to the present invention, it is possible to shift the frequencies of spurious modes independently of the useful mode(s).

According to the present invention, the profiling can be applied both to the first portion (for example an outer beam), which is anchored to the substrate, and alternatively or additionally to the second portion (for example an inner beam), which is joined to the sensor core or the drive structure.

According to the present invention, nonlinearities are thus advantageously reduced. Such nonlinearities of the drive oscillation affect parasitic modes occurring locally on the drive structure. The time averaged stiffening of the drive structure can shift the frequencies of parasitic modes. The higher the nonlinearity of the drive oscillation, the stronger is the effect. The rotation rate sensor according to the present invention, and in particular the spring systems according to the present invention, advantageously reduce the influence of parasitic modes due to the drive oscillation.

According to an example embodiment of the present invention, the first portion joins the drive structure to the intermediate piece, and that the second portion joins the intermediate piece, or a center area situated between the first portion and the second portion of the first spring component, to the substrate.

Advantageous specific embodiments and refinements of the present invention can be derived from the description with reference to the drawings.

As a result of the second spring component being designed, according to an example embodiment of the present invention, essentially mirror-symmetrically to the first spring component, it is possible according to an example embodiment of the present invention that the overall spring system has an at least essentially mirror-symmetrical design, in particular about a plane of symmetry which is situated centrally between the first spring component and the second spring component and extends in the direction of the main extension direction of the first and/or second portion(s) and perpendicularly to the surface of the substrate. It is possible, for example, that a spring system is designed as a DFBS, both the first spring component (in particular a first U-spring) and the second spring component (in particular a second U-spring) including at least one respective profiled portion.

As a result of the first portion and the second portion, according to an example embodiment of the present invention, being situated in parallel to one another in a resting position of the rotation rate sensor in such a way that the first portion and the second portion have the same main extension direction, it is advantageously possible to design the first spring component as a U-spring. Analogously, it is possible to design the second spring component as a U-spring.

According to an example embodiment of the present invention, the variation of the base area of the first portion in the main extension direction of the first portion is designed in such a way that the first portion includes at least one first, second, and third subsection, the second subsection in the main extension direction of the first portion being situated between the first subsection and the third subsection, the second subsection having a smaller or larger base area than the first subsection and/or the third subsection, and the variation of the base area of the second portion in the main extension direction of the second portion being designed in such a way that the second portion includes at least one further first, second and third subsection, the further second subsection in the main extension direction being situated between the further first subsection and the further third subsection, the further second subsection having a smaller or larger base area than the further first subsection and/or the further third subsection. In this way it is advantageously possible, according to an example embodiment of the present invention, that the second subsection and/or the further second subsection is/are situated centrally in the main extension direction of the respective portion. However, it is also possible that the respective portion includes further subsections. Additionally or alternatively, it is possible that the first subsection and the third subsection and/or the further first subsection and the further third subsection each have the same base area. However, it is also possible that the first subsection and the third subsection and/or the further first subsection and the further third subsection each have a different base area.

As a result of the first portion and/or the second portion, according to an example embodiment of the present invention, being designed as beams, in particular having an essentially rectangular base area, it is possible that the first portion and/or the second portion is/are beam springs. It is, in particular, possible that the respective portion designed as a beam can be considered to be multiple beam pieces joined consecutively to one another, i.e., that the first, second, third subsections (and possible further subsections) and/or the further first, further second, further third subsections (and possible further subsections) are each designed as beams.

As a result of the rotation rate sensor, according to an example embodiment of the present invention, including a further spring system, preferably two further spring systems, further preferably three further spring systems, the further spring system, preferably the further spring systems, being designed to be essentially identical to the spring system, it is possible that the rotation rate sensor includes multiple spring systems according to the present invention, which are situated on different sides of the rotation rate sensor, for example, and which preferably (except for a possible relative rotation of the respective further spring system compared to the spring system) all are essentially designed to be identical.

As a result of the first portion, according to an example embodiment of the present invention, including one or multiple additional first, second, and/or third subsection(s), and/or the second portion including one or multiple additional further first, further second, and/or further third subsections, it is possible that arbitrary changes in the base area of the respective portion are achievable over its respective length in the respective main extension direction. It is thus possible to implement more complex spring structures, and to precisely adapt these to the requirements of the respective rotation rate sensor. In principle, it is possible to situate the additional subsections in any arbitrary sequence in the respective main extension direction of the respective portion.

As a result of the first portion, according to an example embodiment of the present invention, including a fourth subsection and/or the second portion including a further fourth subsection, in particular the fourth subsection in the main extension direction of the first portion having a different base area than the first, second, and third subsections, and the further fourth subsection in the main extension direction of the second portion having a different base area than the further first, further second, and further third subsection, it is possible that arbitrary changes in the base area of the respective portion result over its respective length in the respective main extension direction. In particular, it is possible that, in addition to the fourth portion, (in the main extension direction) an additional first, second or third subsection is situated, or also a fifth subsection (having a different base area or length than the first, second, third, fourth subsections). In this way, an arbitrary sequence of different subsections can be implemented for the first portion. The same preferably applies additionally or alternatively to the second portion.

In particular, according to a plurality of example embodiments of the present invention, it is possible that the first, second, third, and possibly fourth, fifth, and so forth, subsections each have different lengths and base areas, but also that some of the subsections have the same length and/or base area. The same applies analogously to the further first, further second, further third, and possibly further fourth, further fifth, and so forth, subsections.

In particular, it is possible according to the present invention that the first portion in each case includes only one or also multiple first, second, third and possibly fourth, fifth, and so forth, subsections. The same applies analogously to the second portion.

The method according to the present invention for manufacturing a rotation rate sensor according to an example embodiment of the present invention has the advantages compared to the related art which were already described in connection with the rotation rate sensor according to the present invention or example embodiment of the rotation rate sensor according to the present invention.

Exemplary embodiments of the present invention are shown in the drawings and are described in greater detail in the following description with respect to the drawings in which identical parts are always denoted by the same reference numerals and are therefore generally also cited or mentioned only once.

DETAILED DESCRIPTION

Figure 1:
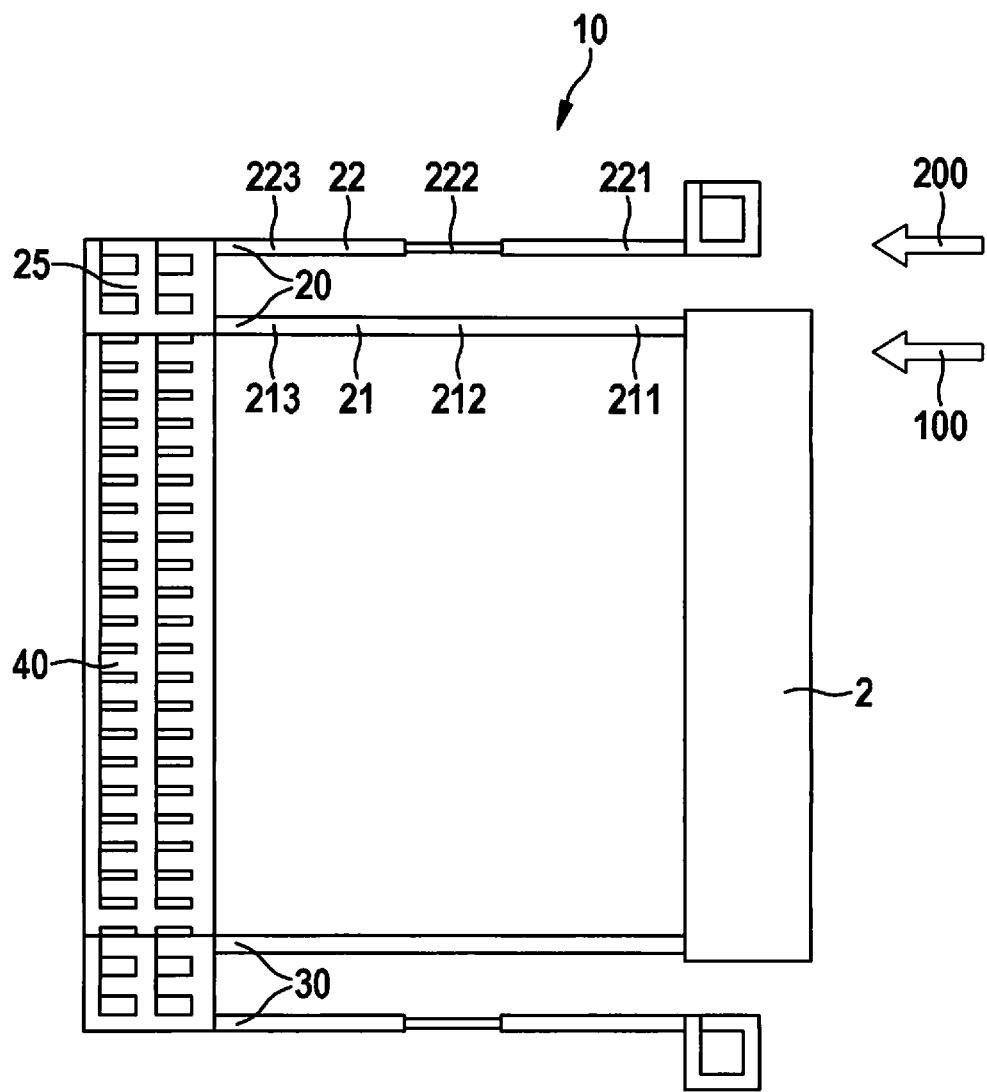
FIG. 1 schematically shows a top view of a section of a rotation rate sensor according to an example embodiment of the present invention.

FIG. 1 schematically shows a top view onto a section of a rotation rate sensor according to an example embodiment of the present invention. The rotation rate sensor includes a spring system 10, which joins a drive structure 2 to a substrate situated essentially below shown spring system 10. The substrate is not explicitly illustrated. Spring system 10 includes a first spring component 20, a second spring component 30, and an intermediate piece 40, with the aid of which a mechanical connection is established between first and second spring components 20, 30. First spring component 20 includes a first portion 21 designed as a beam, and a second portion 22 designed as a beam, first and second portions 21, 22 being joined to a center area 25. Second portion 22 includes a further first subsection 221, a further second subsection 222 and a further third subsection 223, further second subsection 222 in a main extension direction 200 of second portion 22 being situated between further first subsection 221 and further third subsection 223. Further second subsection 222 has a smaller base area, i.e., is less wide and possibly less high, than further first subsection 221 and further third subsection 223. For second portion 22, this results in a varying base area (of second portion 22) in main extension direction 200 of second portion 22. The first portion also has a main extension direction 100. In the present case, main extension directions 100, 200 (illustrated by the arrows) of first and second portions 21, 22 are identical, so that first and second portions 21, 22 are situated essentially in parallel to one another. Furthermore, a first, second, and third subsection 211, 212, 213 are shown for the first portion in FIG. 1 (only for the purpose of clarification), which however all have an identical and consistent base area in the shown specific embodiment. Second spring component 30 is designed mirror-symmetrically to first spring component 20. The plane of symmetry is situated in the center between first and second spring components 20, 30 and extends in the direction of main extension direction 100 of first portion 21, and in a direction perpendicular to the substrate (or its surface). It is possible that intermediate piece 40 is also mirror-symmetrical to this plane of symmetry. It is thus possible that spring system 10 (as shown in FIG. 1) overall is essentially mirror-symmetrical to this plane of symmetry.

The cross-sectional surface which is situated perpendicularly to main extension direction 100, 200 of respective portion 21, 22 is referred to as the base area of first/second portion 21, 22 or of first/second/third/further first/further second/further third subsection 211, 212, 213, 221, 222, 223 in the above description.

Simulations show that, with an optimized beam profile/spring system (in particular the specific embodiment shown in FIG. 1), it is possible according to the present invention, for example, to reduce the nonlinearity of the drive oscillation by 45% compared to a design known from the related art (having first and second portions 21, 22, neither of which has a change in its respective base area over its entire length). In the example embodiment of the present invention shown in FIG. 2, the beam width was increased on the outer beam pieces or further first and further third subsections 221, 223 compared to further second subsection 222 to keep the frequency of the drive oscillation constant.

Figure 2:
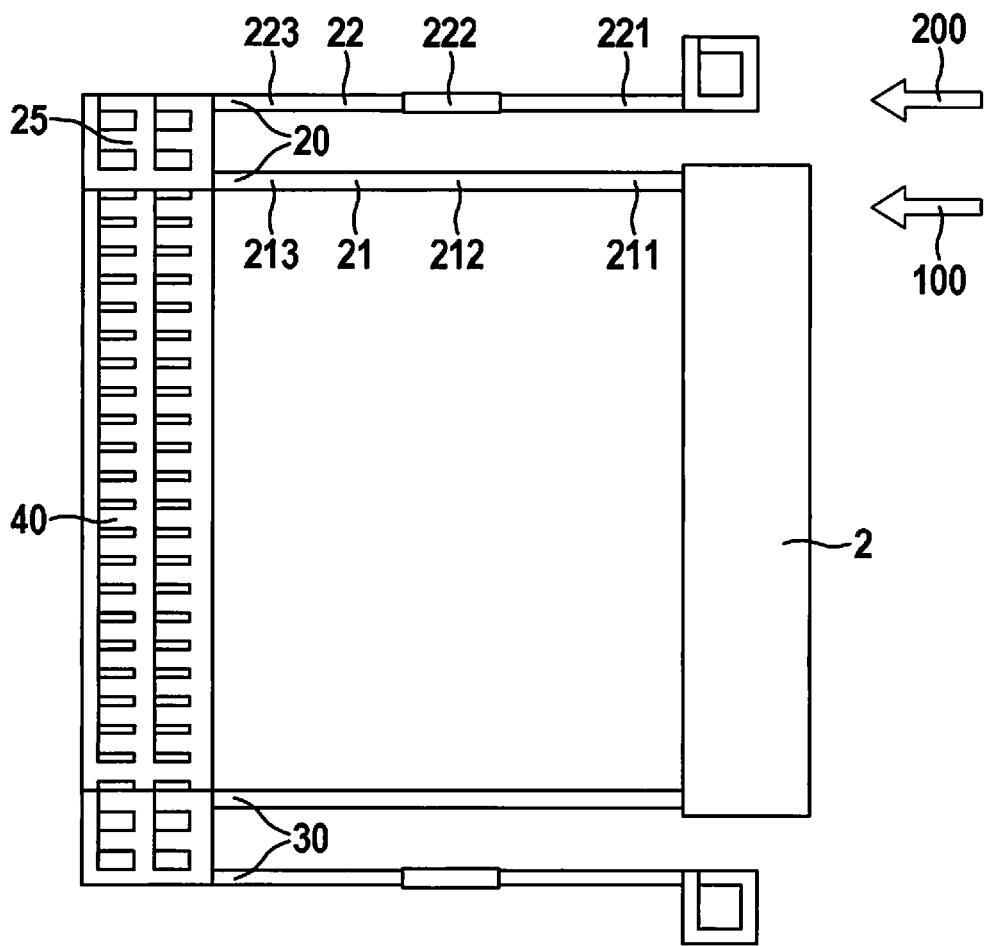
FIG. 2 schematically shows a top view of a section of a rotation rate sensor according to an example embodiment of the present invention.

FIG. 2 schematically shows a top view of a section of a rotation rate sensor according to an example embodiment of the present invention. The example embodiment shown in FIG. 2 largely corresponds to the example embodiment shown in FIG. 1. However, in contrast to the example embodiment shown in FIG. 1, further second subsection 222 has a larger base area, i.e., is wider and possibly higher, than further first subsection 221 and further third subsection 223. In particular, the width of the outer beam pieces (of further first subsection 221 and further third subsection 223) in the example embodiment shown in FIG. 2 is reduced compared to further second subsection 222 to keep the frequency of the drive oscillation constant, which advantageously affects the function of the rotation rate sensor.

Figure 3:
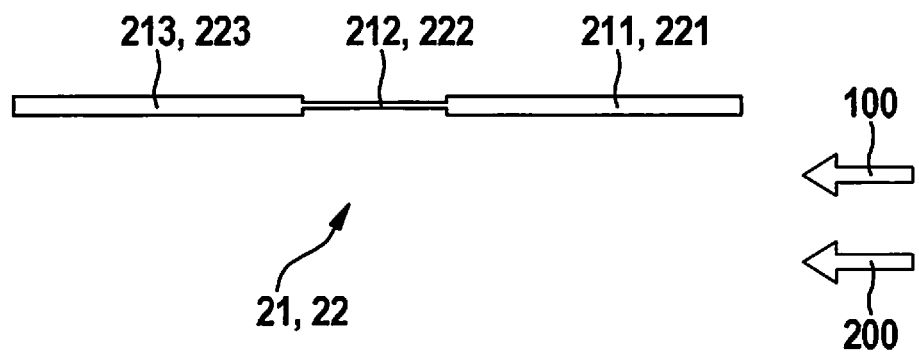
FIG. 3 schematically shows a top view of a first portion or second portion of a spring component of a rotation rate sensor according to an example embodiment of the present invention.

FIG. 3 schematically shows a top view of a first portion 21 or second portion 22 of a spring component 20, 30 of a rotation rate sensor according to an example embodiment of the present invention.

In the case in which FIG. 3 shows a first portion 21, first portion 21 includes first, second, and third portion subsections 211, 212, 213.

Second subsection 212 is situated, in a main extension direction 100 of first portion 21, between first subsection 211 and third subsection 213. In the shown example embodiment, first and third subsections 211, 213 each has the same length in main extension direction 100, and both have the same width and height (i.e., have the same base area). In contrast, second subsection 212 is less wide (and possibly less high) than first and third subsections 211, 213. Furthermore, second subsection 212 is half as long (in main extension direction 100) as first subsection 211 and third subsection 213.

In the case in which FIG. 3 shows a second portion 22, second portion 22 includes a further first subsection 221, a further second subsection 222, and a further third subsection 223. Further second subsection 222 is situated, in a main extension direction 200 of second portion 22, between further first subsection 221 and further third subsection 213. In the shown example embodiment, further first and further third subsections 221, 223 each has the same length in main extension direction 200, and both have the same width and height (i.e., have the same base area). In contrast, further second subsection 222 is less wide (and possibly less high) than further first and further third subsections 221, 223. Moreover, further second subsection 222 is half as long (in main extension direction 200) as further first subsection 221 and further third subsection 223.

What is claimed is:

1. A rotation rate sensor comprising:
   a substrate; and
   a drive structure movable relative to the substrate and fastened to the substrate via a spring system that includes first and second spring components that each connects the drive structure to the substrate and that are joined to each other via an intermediate piece, wherein the first spring component includes a first portion and a second portion joined by a center area;
   wherein:
      the intermediate piece or the center area is joined to the substrate; and
      at least one of (a) the first portion of the first spring component has a base area that varies in a main extension direction of the first portion of the first spring component and (b) the second portion of the first spring component has a base area that varies in a main extension direction of the second portion of the first spring component,
      wherein, in a resting position of the rotation rate sensor, the first and second portions are parallel to each other such that the main extension directions of the first and second portions are the same.

2. The rotation rate sensor of claim 1, wherein the second spring component is essentially designed mirror-symmetrically to the first spring component.

3. The rotation rate sensor of claim 1, wherein:
   the second portion of the first spring component has the base area that varies in the main extension direction of the second portion of the first spring component;
   the variation of the base area of the second portion of the first spring component in the main extension direction of the second portion of the first spring component is such that the second portion of the first spring component includes at least first, second, and third subsections; and
   the second subsection of the second portion of the first spring component:
      is, with respect to the main extension direction of the second portion of the first spring component, between the first and third subsections of the of the second portion of the first spring component; and has a smaller or larger base area than at least one of the first and third subsections of the second portion of the first spring component, wherein, in a resting position of the rotation rate sensor, the first and second portions are parallel to each other such that the main extension directions of the first and second portions are the same.

4. The rotation rate sensor of claim 1, further comprising a further spring system that is identical to the spring system.

5. The rotation rate sensor of claim 1, further comprising two further spring systems that are each identical to the spring system.

6. The rotation rate sensor of claim 1, further comprising three further spring systems that are each identical to the spring system.

7. The rotation rate sensor of claim 1, wherein:

the first and second portions of the first spring component both have the varying base areas in the respective main extension directions of the first and second portions of the first spring component;

the variation of the base area of the first portion of the first spring component in the main extension direction of the first portion of the first spring component is such that the first portion of the first spring component includes at least first, second, and third subsections;

the variation of the base area of the second portion of the first spring component in the main extension direction of the second portion of the first spring component is such that the second portion of the first spring component includes at least first, second, and third subsections;

the second subsection of the first portion of the first spring component:
  is, with respect to the main extension direction of the first portion of the first spring component, between the first and third subsections of the of the first portion of the first spring component; and
  has a smaller or larger base area than at least one of the first and third subsections of the first portion of the first spring component; and the second subsection of the second portion of the first spring component:
  is, with respect to the main extension direction of the second portion of the first spring component, between the first and third subsections of the of the second portion of the first spring component; and
  has a smaller or larger base area than at least one of the first and third subsections of the second portion of the first spring component.

8. The rotation rate sensor of claim 7, wherein:

the first and third subsections of the first portion of the first spring component are essentially of a same length in the main extension direction of the first portion of the first spring component;

with respect to the main extension direction of the first portion of the first spring component, the second subsection of the first portion of the first spring component is half as long as the first subsection of the first portion of the first spring component;

the first and third subsections of the second portion of the first spring component are essentially of a same length in the main extension direction of the second portion of the first spring component; and with respect to the main extension direction of the second portion of the first spring component, the second subsection of the second portion of the first spring component is half as long as the first subsection of the second portion of the first spring component.

9. The rotation rate sensor of claim 1, wherein at least one of the first and second portions is a beam.

10. The rotation rate sensor of claim 9, wherein the beam has an essentially rectangular base area.

11. The rotation rate sensor of claim 1, wherein:

the first portion of the first spring component has the varying base area in the main extension direction of the first portion of the first spring component;

the variation of the base area of the first portion of the first spring component in the main extension direction of the first portion of the first spring component is such that the first portion of the first spring component includes at least first, second, and third subsections; and the second subsection of the first portion of the first spring component:
  is, with respect to the main extension direction of the first portion of the first spring component, between the first and third subsections of the first portion of the first spring component; and
  has a smaller or larger base area than at least one of the first and third subsections of the first portion of the first spring component.

12. The rotation rate sensor of claim 11, wherein the first and third subsections of the first portion of the first spring component are essentially of a same length in the main extension direction of the first portion of the first spring component, and, with respect to the main extension direction of the first portion of the first spring component, the second subsection of the first portion of the first spring component is half as long as the first subsection of the first portion of the first spring component.

13. The rotation rate sensor of claim 11, wherein the first and third subsections have essentially the same base area.

14. The rotation rate sensor of claim 11, wherein the first portion includes at least one of: one or more additional first subsections, one or more additional second subsections, and one or more additional third subsections.

15. The rotation rate sensor of claim 11, wherein the first portion includes a fourth subsection in the main extension direction of the first portion, which has a different base area than the first, second, and third subsections.

* * * * *